(12) United States Patent
Mitamura (10) Patent No.: US 6,564,075 B1
(45) Date of Patent: May 13, 2003

(54) WRIST MOBILE INFORMATION DEVICE

(75) Inventor: Gen Mitamura, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/685,538

(22) Filed: Oct. 10, 2000

(30) Foreign Application Priority Data

Oct. 13, 1999 (JP) ............................................. 11-291618

(51) Int. Cl.⁷ ................................................. H04B 1/38
(52) U.S. Cl. ........................... 455/575; 455/74; 455/90; 379/433.01
(58) Field of Search ............................ 455/575, 90, 74, 455/550; 379/433.01, 433.02, 433.03, 433.04

(56) References Cited

U.S. PATENT DOCUMENTS

| | | | | |
|---|---|---|---|---|
| 4,847,818 A | * | 7/1989 | Olsen .......................... | 455/575 |
| 5,214,623 A | * | 5/1993 | Seager ......................... | 455/575 |
| 5,218,577 A | * | 6/1993 | Seager ......................... | 379/433 |
| 5,260,915 A | * | 11/1993 | Houlihan ...................... | 379/90 |
| 5,274,613 A | * | 12/1993 | Seager ......................... | 379/434 |
| 5,467,324 A | * | 11/1995 | Houliham ...................... | 379/428 |
| 5,499,292 A | * | 3/1996 | Blonder et al. ............... | 379/433 |
| 5,936,530 A | * | 8/1999 | Meinhold ................. | 340/573.1 |
| 6,052,070 A | * | 4/2000 | Kivela et al. ................ | 455/575 |
| 6,192,253 B1 | * | 2/2001 | Charlier et al. .............. | 455/550 |
| 6,212,414 B1 | * | 4/2001 | Alameh et al. ............... | 455/575 |
| 6,249,684 B1 | * | 6/2001 | Hasegawa .................... | 455/550 |

* cited by examiner

*Primary Examiner*—Edward F. Urban
*Assistant Examiner*—Tilahun Gesesse
(74) *Attorney, Agent, or Firm*—Adams & Wilks (57) ABSTRACT

A wrist mobile information device is attached with arm holders different in length through a ratchet mechanism. A spring is added or buried at the backside of the arm holder.

38 Claims, 6 Drawing Sheets

WRIST MOBILE INFORMATION DEVICE

BACKGROUND OF THE INVENTION

1. Field of the Invention

This invention relates to a wearable structure of a wrist mobile information device attachable to the arm and to the arrangement of a microphone and speaker provided on the wrist mobile information device.

2. Description of the Prior Art

Conventionally, there have been various wristwatches designed for wearing on the arm. However, due to so-called downsizing of electronic devices and size reduction and performance improvement of electric elements themselves, there is a recent trend of wearing on the arm an information device having advanced multi-functions such as GPS (Global Positioning System) function, computer function and telephonic function as represented by cellular phones and PHS (Personal Handyphone System). They are no longer called wristwatches but are called wrist mobile information devices among other things.

The wearable structure of wrist mobile information devices is analogous in overall shape to wristwatches. Hence, it is still current to carry them by a belt wound on the arm much like wristwatches and by engaging the belt ends by hardware. Meanwhile, where the wrist mobile information device has a telephonic function, there is a case that a microphone and speaker are added on the front of the wrist mobile information device main body. However, since the apparatus main body has been fixed by the belt, a telephonic communicator at call arrival has talked with his or her hand fixed in front of their face.

However, according to the prior art, there has been a problem that the wrist mobile device is fixed by the belt and cannot be immediately detached. This problem is conspicuous where the wrist mobile information device possesses the telephonic function. That is, where the wrist mobile information device has the telephonic function, it is difficult to detach it from the arm immediately after call arrival and put it close to the ear and mouth of the communicator. Moreover, if the wrist mobile information device is gripped from the side of the hand back and directly put it to the ear without changing the direction, the backside of the wrist mobile information device hits the ear. However, because the microphone and speaker are provided only on the surface, there has been a problem that on every occasion the wrist mobile information device be set to the ear by confirming a direction thereof.

Therefore, this invention has been made in view of the foregoing and it is an object of this invention to provide a wearing structure of a wrist mobile information device so that the wrist mobile information device can be attached to and detached from the arm through simple manipulation. Another object of this invention is to provide an arrangement structure of a microphone and speaker so that telephonic talk is possible at any of the topside and backside of the wrist mobile information device when the wrist mobile information device is used as a telephone receiver.

SUMMARY OF THE INVENTION

Conventionally, the soft strap is released at the buckle by taking the time to detach it. In order to achieve the above object, an arm-wearing structure of a wrist mobile information device according to this invention has hard curved arm holders to clamp an arm so that the arm holders can be attached and detached in a one-touch way.

Meanwhile, an arm-wearing structure of a wrist mobile information device according to this invention has at least one postion of an arm holder made rotatable, and a ratchet mechanism at at least one end of a rotary, shaft. In addition to this, a spring is added to an arm-holder attaching shaft to automatically release the arm when the ratchet mechanism is released.

Also, in an arrangement structure of a microphone and speaker of a wrist mobile information device according to this invention, a microphone and a speaker are respectively provided at end faces in the vicinity of an arm holder attaching part of a wrist mobile information device, enabling both talking at a surface of the wrist mobile information device worn on the arm and talking with the wrist mobile information device detached from the arm and put at its backside on a human face side surface.

BRIEF DESCRIPTION OF THE DRAWINGS

A preferred form of the present invention is illustrated in the accompanying drawings in which.

DETAILED DESCRIPTION OF THE PREFERRED EMBODIMENTS

Hereunder, this invention will be explained in detail with,reference to the drawings. Note that the invention is not limited by the embodiment.

Embodiment 1

Figure 1A:
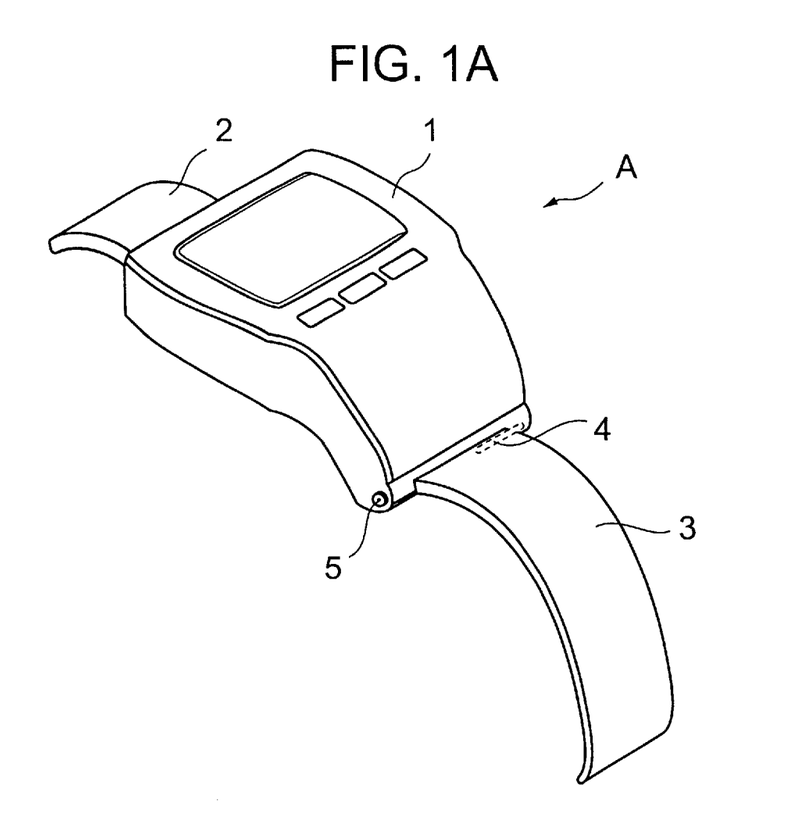
FIGS. 1A and 1B are perspective views showing the entire wrist mobile information device according to Embodiment 1 of the invention.
Figure 1B:
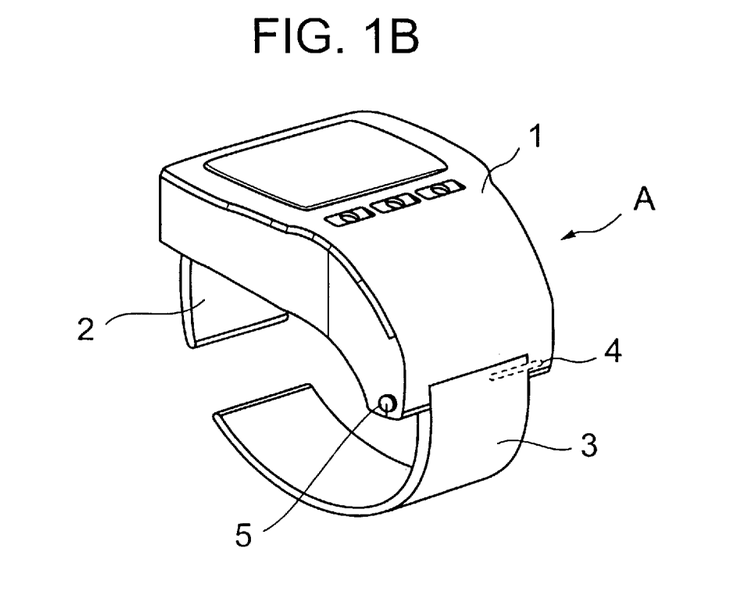

FIG. 1 are perspective views showing the entire wrist mobile information device according to Embodiment 1 of the invention. FIG. 1A is a perspective view of arm holders 2, 3 when opened, and FIG. 1B is a perspective view arm holders 2, 3 when closed. The wrist mobile information device A is provided with a main body 1 and two arm holders 2, 3 different in length. The arm holders 2, 3 have a properly curved form in order to be worn on a human wrist and set to a face side of a communicator where the wrist mobile information apparatus is also for a telephone receiver. Here, the material for the arm holder 2, 3 may be metal or something else possessing somewhat more resiliency such as plastic but less deformable hard plastics are preferably used. An arm holder attaching shaft 4 and a ratchet release button 5 are provided in the end of the main body 1.

Incidentally, where the ratchet mechanism is not necessary, cut-outs for fixing in a state the arm holders 2, 3 are maximally opened and suited for a thickness of a user's wrist may be provided in an arm holder attaching part on the side of the main body 1, and protrusions to be fit with the cut-outs may be provided in end faces of the arm holders.

Although there exist various types of ratchet mechanisms, explanation is herein made on one example of a ratchet mechanism suited for the wrist mobile information device according to Embodiment 1. Accordingly, the ratchet mechanism is not limited to a structure shown herein.

The ratchet mechanism can be provided at a total of four locations of both ends of an elongate arm holder attaching shaft 4 and both ends of a short arm holder attaching shaft (not shown). However, the ratchet mechanism is not necessarily provided at four locations, but it is satisfactory to provide this mechanism at at least one end of the shaft. In a position no ratchet mechanism is provided, the shaft may be inserted through a hollow hole or through-hole opened in the arm holder 2, 3 for allowing it to rotate.

Figure 2A:
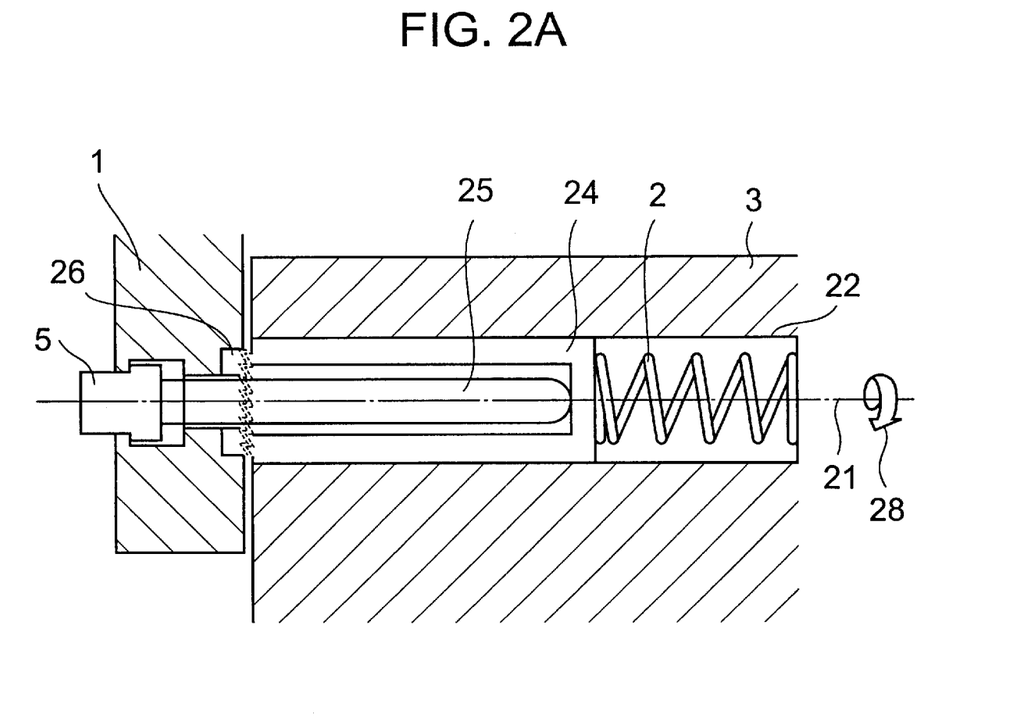
FIGS. 2A, 2B, and 2C each are a sectional view showing the structure in the vicinity of a ratchet release button provided in an arm holder and main body side face according to Embodiment 1 of the invention and perspective views showing pawl crown structures on both a main body side and a holder side.

FIG. 2A is a sectional view of the vicinity of a ratchet release button 5 provided in the arm holder 3 and the side surface of the. main body 1. This figure is a sectional view as viewed from the surface side of the main body 1 wherein a ratchet mechanism is provided only on the left side as viewed facing a top surface of the arm holder 3. As shown. in the figure, this ratchet mechanism is structured with two parts, that is, a part on the arm holder 3 side and a part on the main body 1 side.

Figure 2B:
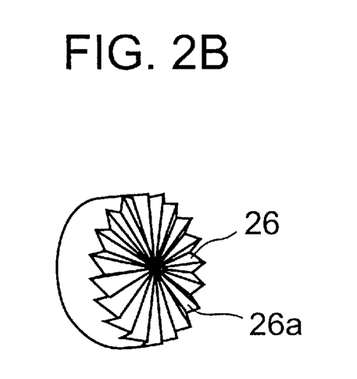
Figure 2C:
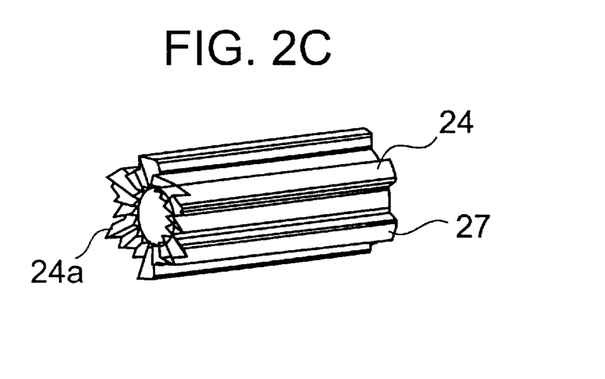

In the part on the arm holder 3 side, a spring 23 is inserted in a hollow hole 22 provided along a rotary shaft 21 of the elongate arm holder 3. Further, on the open side of the hollow hole a ratchet block 24 is inserted against the spring 23. FIG. 2C is a perspective view of the ratchet block 24. The ratchet block 24 is generally of a cylindrical form and a saw tooth pawl 24a is formed in an end face contacting the main body 1. Also, a spline 27 is cut to rotate in unison with the arm holder 3 in a manner of movable in an axial direction.

Meanwhile, the part on the main body 1 side has a pawl crown 26 formed opposed to the ratchet block 24. FIG. 2B is a perspective view of the pawl crown 26 provided on the main body 1 side. The pawl crown 26 is formed with a saw tooth pawl 26a corresponding to the saw tooth pawl 24a of the ratchet block 24, which is put in mesh with the ratchet block 24.

The ratchet block 24 in the hollow hole 22 is urged on the pawl crown 26 by a repelling force of the spring 23 and engages it so that no axial gap is formed between the both saw tooth pawls 24a, 26a on the ratchet block 24 and pawl crown 26. Thus, the arm holder 3 is formed rotatable in the direction of tightening an arm but not rotatable in the direction opposite thereto.

The ratchet release button 5 is directly connected with a ratchet shaft 25 penetrating through the pawl crown 26 fixed in the main body and abutting against an inner bottom of the ratchet block 24. The ratchet shaft 25 may be made integral with the release button 5. Means for preventing the ratchet shaft 25 from falling-out, in FIG. 2A, forcibly insert an engaging part of the release button 5 in a shaft hole of the main body 1, but may be prevented from falling-out by a falling-prevention pin or a screw.

Meanwhile, in FIGS. 2A and 2B an explanation was made that the pawl crown 26 on the main body 1 was as an independent part. However, a saw tooth pawl may be directly formed continuously in a circumferential direction on the surface contacting the arm holder 3 of the main body 1. The number of pawls in the saw form is preferably as many as possible where the arm holder is desirably fixed in an arbitrary unspecified position. However, because the increased number of the pawls increases the outer diameter of the ratchet and decreases the depth of the pawl engaging part, there is a necessity of determining to a proper number according to a dimensional diameter or material of the ratchet part. That is, with a plastic material there is a need of increasing the engagement by increasing the outer diameter or decreasing the number. In the case of a high-strength metal, it is possible to reduce the outer diameter or increase the number of pawls because the engagement can be decreased. Meanwhile, where the position of the arm holder is specified, the pawl part may be one in number.

Next, the operation of the above ratchet mechanism will be explained. As stated above, the saw tooth pawls 24a, 26a are both formed on the ratchet block 24 and the pawl crown 26 on the main body 1 side, and are put in mesh. Consequently, the arm holder 3 rotatably integral with the pawl crown 24 through the spline 27 on the ratchet block 24 is allowed to rotate only in the direction of tightening around an arm, due to a nature of the saw tooth pawl (clockwise 28 as viewed from a ratchet release button 5 side in FIG. 2A). When the arm holder 3 is to be reverse rotated in the direction of releasing it from the arm, pressing the ratchet release button 5 pushes and separates the engaged two saw tooth pawls 24a, 26a, thus enabling the reverse rotation. When the ratchet release button 5 is released, the two pawls 24a, 26a are again placed into mesh by the spring 23, thus permitting rotation only in one direction.

Due to such structure and operation, if the ratchet mechanism is made to allow the arm holder 3 to rotate only in the direction of surrounding an arm, it is possible to determine an arm-fit size in a stepwise way by the nature of the pawls 24a, 26a possessed by the ratchet mechanism. Also, once suited for an arm, there encounters no natural loosening until releasing the ratchet mechanism thus preventing unintentional fall incident. Furthermore, the ratchet mechanism can release the prevented reverse rotation by only one button, thus providing extreme convenience for a case that there is a need of immediately detaching the wrist mobile information device.

In the above, explanation was made on the case that the ratchet mechanism was provided only on one side of the rotary shaft of the arm holder 3. In the case of providing the ratchet mechanisms on both sides, it is satisfactory on the main body 1 side to provide a ratchet release button 5, a ratchet shaft 25 and a main-body-1-side pawl crown 76, as quite similar to the above. On the other hand, it is satisfactory on the arm holder side to provide a hollow hole 22 as stated before, wherein a through-hole may be opened to insert therein a spring at opposite side of which the spring is sandwiched by two ratchet blocks 24, 74 at a bottom. Here, the ratchet block 74 and the pawl crown 76 have, at the end surfaces, saw tooth pawls 74a, 76a cut in a mirror-image relation to 24a, 26a. This is true for a case of providing a ratchet on a short-length arm holder 2.

In the case of a one-sided ratchet, the ratchet can be easily released open by holding one point of the release button but conversely includes a danger of unintentionally being pressed and released. In the case of providing ratchet mechanisms on both sides, because release buttons must be pressed simultaneously at both ends of the shaft, the possibility of unintentional simultaneous pressing is reduced and safety is enhanced. Also, the external force applied to the saw tooth pawls 24a, 26a of the ratchet is broken up into half, thus increasing the structural strength of the ratchet part.

Figure 3:
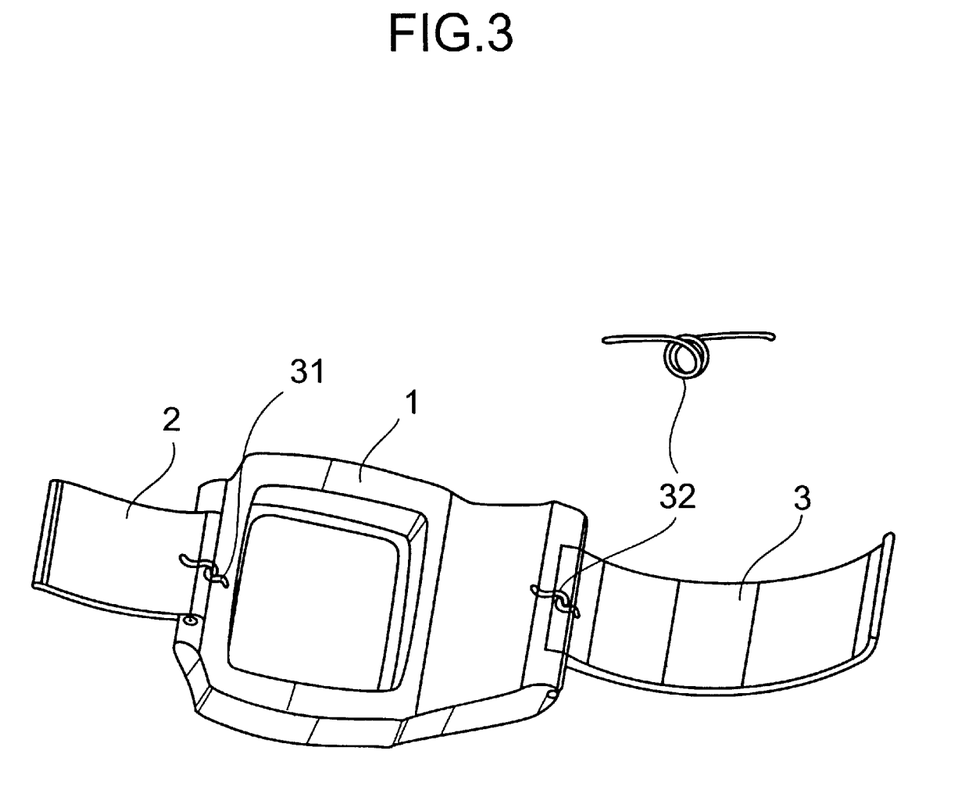
FIG. 3 is a perspective view showing a structure on the back side of the main body attached with two arm holders according to Embodiment 1 of the invention.

Next, the structure and operation of the backside of the main body 1 is explained. FIG. 3 is a perspective view of the backside of the main body 1 having two arm holders 2, 3 attached thereto. In the vicinity of the two arm holders 2, 3 and their attaching shafts (not shown), springs 31, 32 are attached or buried as shown in the figure. In the state that the ratchet is released, the arm holders 2, 3 are automatically kept in an open state. Incidentally, although in the figure the springs 31, 32 are shown spiral, leaf springs that always return flat may be connected to the arm holders 2, 3.

Figure 4:
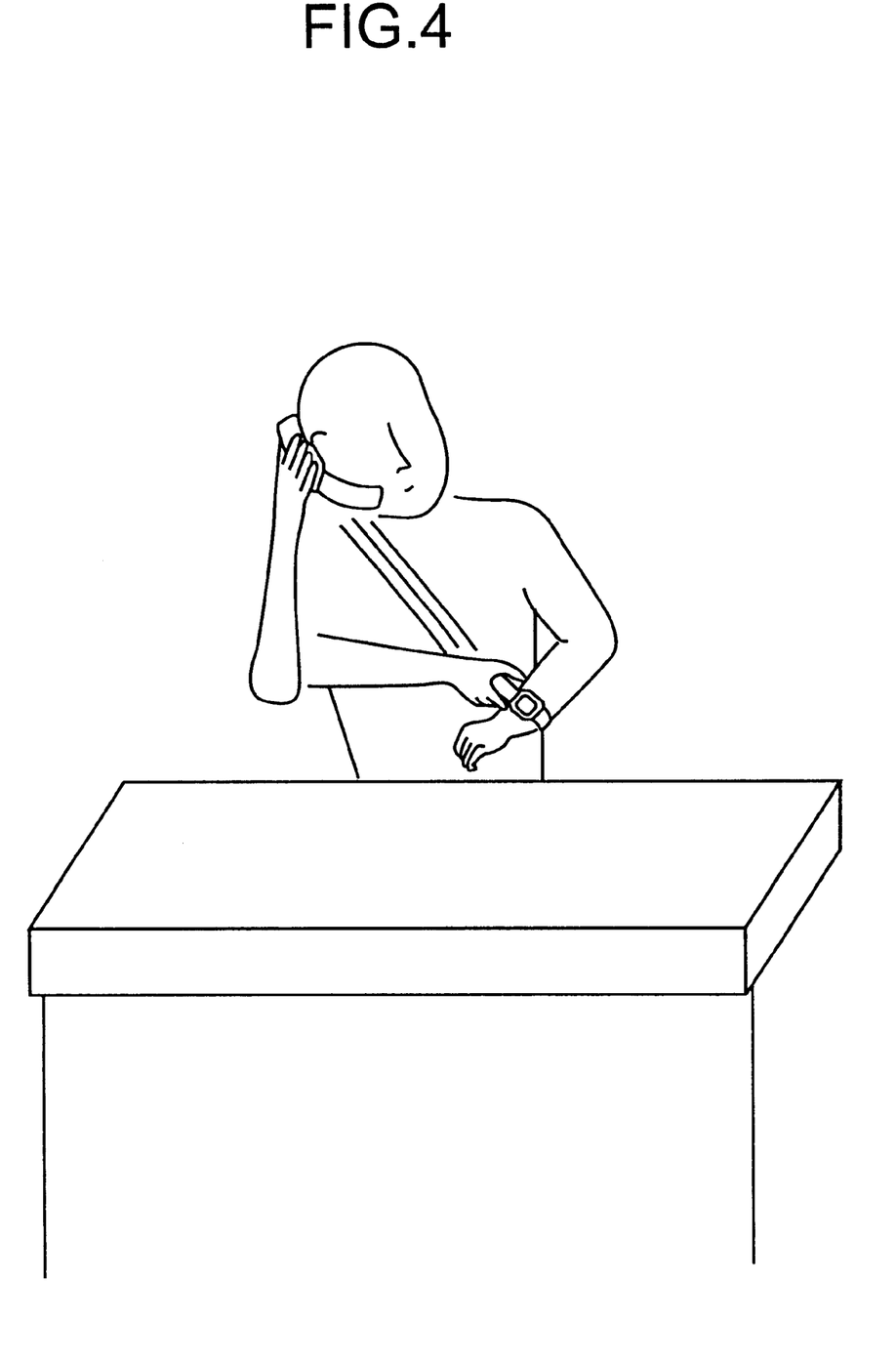
FIG. 4 is a concept view showing a removal operation of the wrist mobile information device according to Embodiment 1 of the invention.

By the above structure, in the wrist mobile information device according to Embodiment 1, if a ratchet mechanism of a longer one of two arm holders is released, the arm holder itself plunges into the inside of a hand which has pressed the ratchet release button. Thus, the wrist mobile information device can be extremely easily attached from the arm. Also, the arm holder in plunging can be positively griped by the palm, greatly reducing the danger of falling of the wrist mobile information device. Also, where the wrist mobile information device serves as a telephone receiver, as shown in FIG. 4 the wrist mobile information device can be immediately removed from the arm, and the wrist mobile information device can be fitted to an ear by the hand used for such removal, thus being extremely convenient for telephonic communication. Further, because the arm holder maintains a state of largest opening by the spring, an effect is provided that there is no interference during telephonic communication.

Embodiment 2

Figure 5A:
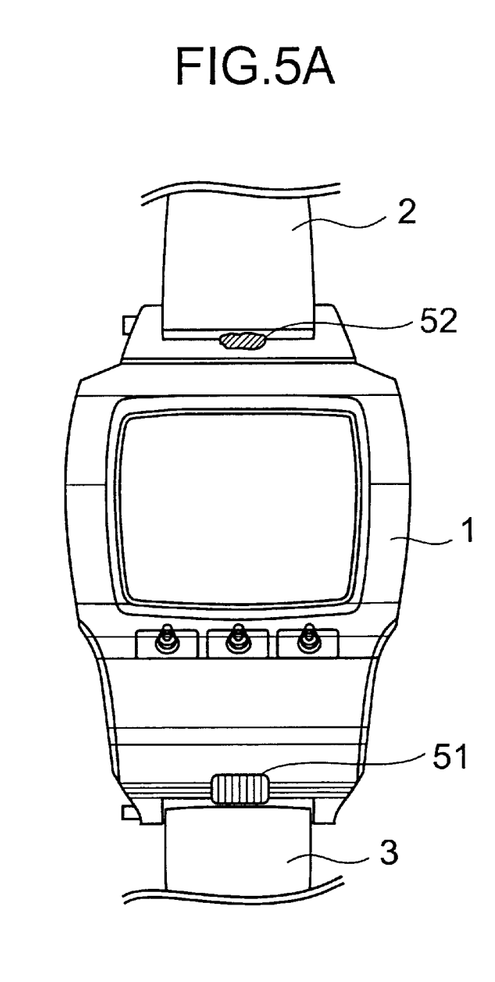
FIGS. 5A and 5B each are a front view of a wrist mobile information device showing an arrangement structure with a microphone and speaker of the wrist mobile information device according to Embodiment 2 of the invention and a side view showing a sound output state and sound collection state of the wrist mobile information device.

FIG. 5A is a front view of a wrist mobile information device showing an arrangement structure of a microphone and speaker of the wrist mobile information device according to Embodiment 2 of the invention. Where the wrist mobile information device has a telephonic function, it can be considered to perform telephonic communication with an earphone jack inserted to the main body 1. However, the main body is preferably provided with a microphone and earphone. Consequently, in Embodiment 2, a microphone 51 was provided in the end face of the main body 1 near the position for attaching the arm holder 3, and a speaker 52 was in the end face of the main body 1 near the position for attaching the arm holder 2. That is, the microphone 151 was provided in the end face on the radius side of the main body 1 and the speaker 52 was in the end face on the ulna side of the main body 1.

Where the wrist mobile information device has a telephonic function as stated above, three methods can be considered for telephonic communication. One is a method of communication with the wrist mobile information device kept worn on the arm. Another is a method of performing communication by detaching the wrist mobile information device and setting the surface of the wrist mobile information device 1 to an ear of a communicator. The remaining one is a method of performing communication by detaching the wrist mobile information device from the arm and setting the backside of the wrist mobile information device 1 to an ear of a communicator.

Figure 5B:
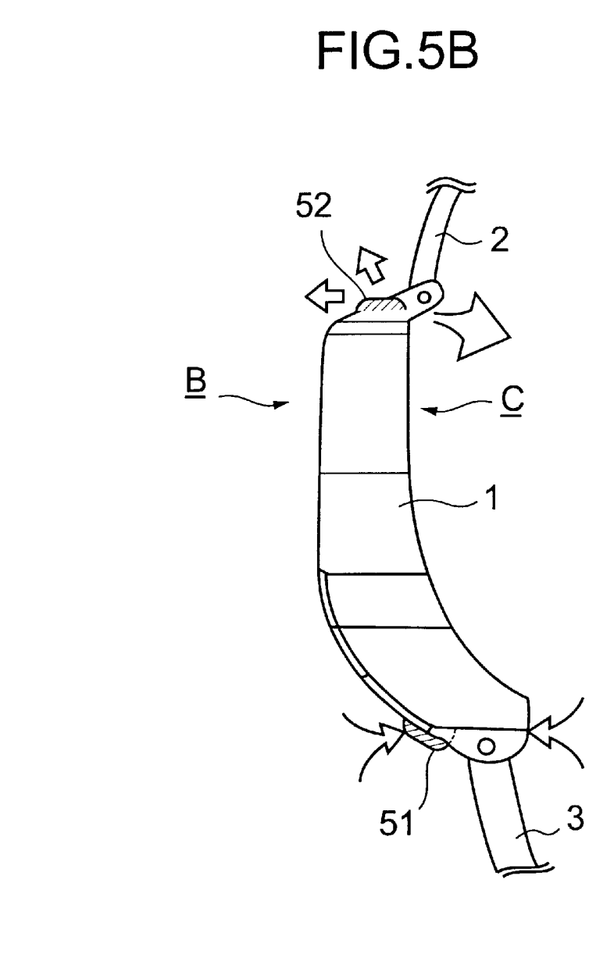

FIG. 5B is a side view showing a sound output state and sound collecting state of the wrist mobile information device. B designates a surface of the wrist mobile information device main body 1, and C the backside thereof. As was shown by the arrow in the figure, the microphone 51 can collect sound not only at the surface of the wrist mobile information device main body 1 but also at the backside through a gap between the arm holder 3 and the main body. Also, the speaker 52 can also output sound not only at the surface but also at the backside through the gap between the arm holder 2 and the main body 1. Consequently, the wrist mobile information device according to Embodiment 2 of the invention can realize all the three communication methods by providing the microphone 51 and speaker 52 at the ends of the main body 1. Meanwhile, the wrist mobile information device according to the present Embodiment 2 is literally of such a size as permitting it to be worn on the arm. Accordingly, the distance is short between the microphone 51 and the speaker 52 that are provided in two ends. Accordingly, telephonic communication is possible without problem by merely talking to the main body 1 without paying attention to what form the microphone and the speaker are arranged (which one is on the end face of the radius or on the end face of the ulna). Also, while the wrist mobile information device is worn on an arm, the arm holders 2, 3 cut off sweat from the arm and prevent the sweat from entering the microphone 51 and speaker 52 at the end of the main body 1. Also, because the arm holders 2, 3 are curved toward the backside of the wrist mobile information device, effects are provided that the sound of talk by a communicator is readily collected to the microphone and further the sound through the speaker 52 is easily collected to an ear when communicating by the method of setting the backside to a vicinity of the ear of the communicator.

Figure 6:
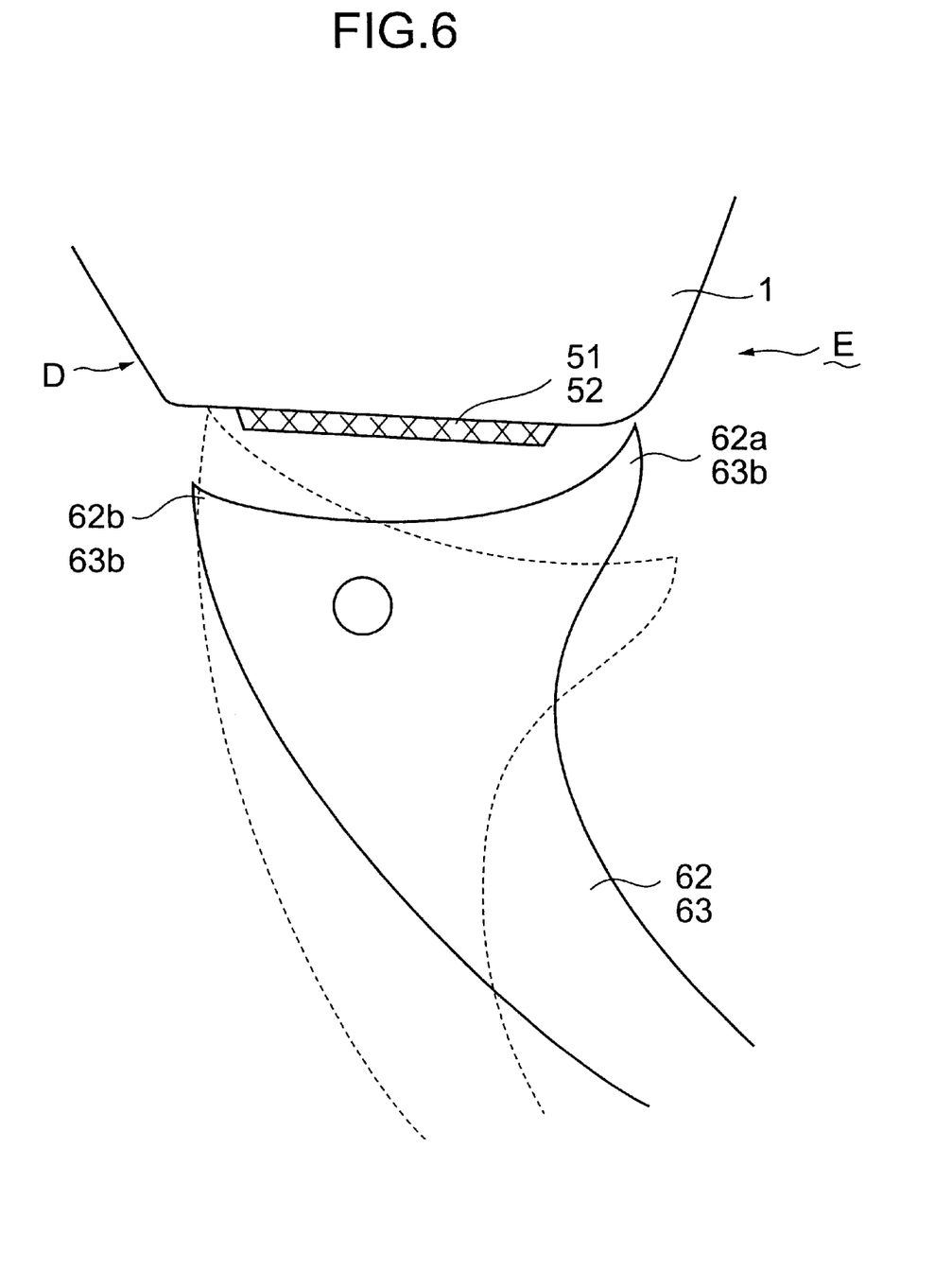
FIG. 6 is a side view showing a structure of a main body end part and arm holders according to Embodiment 1 of the invention.

FIG. 6 is a side view showing a structure of a main body 1 end and arm holder 62. A microphone 51 is provided in the main body 1 end similarly to the above. As shown in the figure, the arm holder 62 has a concave protrusion 62a on the side of the case backside over the entire region of the arm holder 62 in the vicinity of the rotary shaft 21, and a concave protrusion 62b on the side of the back side of the case backside. FIG. 6 represents a state the arm holder 62 is worn on an arm wherein a maximally open state is expressed by the dotted line. As shown in the figure, the protrusion 62a, when worn on the arm, covers over the microphone 51 to promote sound collection at a surface D of the main body 1. Also, the protrusion 62b reduces noise input at the surface of the main body 1 and accelerates sound collection through the backside E in a maximally open state with the arm holder 62 detached from the arm. Consequently, according to this structure, when communicating in a state the wrist mobile information device is kept worn on the arm, sound collection is accelerated at the surface D of the main body 1. When communicating in a state the wrist mobile information device is detached from the arm, sound collection is accelerated in the direction of from the backside E of the main body 1. Thus, sound collection is possible depending upon the communication form. Also, similarly to the above, the protrusion 62a accelerates the effect of preventing the sweat on the arm from entering the microphone 51. Although explanation was made on the microphone 51 and the arm holder 62, sound output can be efficiently conveyed to the communicator by providing the quite same structure to the relation of the speaker 52 and arm holder 63.

As was explained above, in this invention because the arm holder of the wrist mobile information device in a position on a hand thumb side is made long, the wrist mobile information device can be attached and detached while positively gripping it. Also, where the wrist mobile information device has a function as a telephone receiver, the wrist mobile information device and the longer arm holder can be gripped as one body. Despite the fact that main body as the telephone receiver is extremely small in size, telephone talk is possible in the same sense as other telephone receivers. Furthermore, the arm holder of the wrist mobile information device according to the invention can reflect both a curvature of radius of a wrist section and a radius of curvature of the face of from an ear to a cheek. Accordingly, when the wrist mobile information device is detached from an arm and the main body speaker is set to an ear of a communicator, the longer arm holder just covers over a mouth of the communicator thus improving the sound collection rate of the microphone.

Next, in the invention, because each shaft of the two arm holder attaching shafts in at least one end has a ratchet mechanism, when the wrist mobile information device is worn on an arm, the wrist mobile information device main body can be attached on an arm extremely easily and immediately without the feeling of troublesomeness as in engagement with a belt and hardware is felt. Also, the nature of the pawl crown possessed on the ratchet mechanism makes it possible to determine a fit size in a stepwise way. Due to this, fitness to a wrist of any person is available regardless of the gender of a wearer. Also, the ratchet mechanism allows rotation only in one direction and prevents rotation in the reverse direction. Accordingly, if the rotational direction allowed of the arm holder is taken in the direction surrounding an arm, if once fitted to the arm, there is no natural loosening until the ratchet mechanism is released thus preventing unintentional fall incident. Furthermore, because the ratchet mechanism can release from reverse rotation having been prevented with one button, it is possible to cope with in a case requiring immediate removal of the wrist mobile information device.

Next, in the invention, a spring is added to the arm holder attaching shaft part. When the ratchet release button is pushed to release the ratchet mechanism, the arm holder so far surrounded an arm is devised to spring up about the rotary axis. At this time, if releasing the ratchet mechanism of a longer arm holder of the two arm holders, the arm holder itself plunges into a palm inside of a hand having pressed the ratchet release button. Thus, positive grip is possible thus considerably reducing the danger of falling the wrist mobile information device. Also, where the wrist mobile information device serves as a telephone receiver, the wrist mobile information device can be immediately removed from an arm and the wrist mobile information device be set to an ear by a hand of that removal. Thus, it is extremely convenient for call reception.

Next, in the invention, because the microphone and the speaker are respectively provided in the end faces of the wrist mobile information device, sound collection and sound output are possible through both the main body surface and backside. This makes it possible both to talk to the surface in a state the wrist mobile information device is worn on an arm and to talk in a state the wrist mobile information device is removed from the arm and set the backside to a human side face.

Also, in the invention, because a concave protrusion is provided in the end face of the arm holder attaching part, the wrist mobile information device, while worn on the arm, cuts off sweat from the arm preventing the sweat from entering the microphone and speaker at the main body end. At the same time, during telephone talking while put on the arm, promoted are sound giving-off effect to a case surface and sound collecting effect from the case surface. Also, where talking with removed from the arm, i.e. in a state the arm holder is released, sound shield effect to the case surface is enhanced hence promoting sound giving-off effect and sound collecting effect are promoted at the case backside.

What is claimed is:

1. A wrist mobile information device comprising: a main body; a mobile communication circuit disposed in the main body; a pair of arm holders each mounted through a rotary shaft thereof to an opposite end of the main body and being axially pivotable about the rotary shaft with respect to the main body and having a ratchet mechanism disposed in the rotary shaft for maintaining the arm holder in a closed position on a user's arm; a release button exposed at an external surface of the main body for releasing a locking force of the ratchet mechanism; and a spring mounted to at least one of the arm holders for applying a biasing force in an open direction of the arm holder so that the arm holder automatically releases the user's arm when the ratchet mechanism is released.

2. A wrist mobile information device comprising: a main body; a mobile communication circuit disposed in the main body and having at least one of a speaker and a microphone exposed at an external surface of the main body; a pair of arm holders each mounted to the main body proximate one of the speaker and the microphone for attaching the main body to a user's arm, the arm holders each comprising a rigid member curved to conform to the contour of the user's arm and being different in length from each other, the arm holders being configured so that when the arm holders are in a closed state and the wrist mobile information device is worn on a user's wrist with a rear side of the device confronting the user's wrist, a space is formed on a front side of the device opposite the rear side between the arm holders and the speaker or microphone to collect sound at the front side, and when the wrist mobile information device is not worn on the user's wrist and the arm holders are in an open state, a space is formed on the rear side of the device between the arm holders and the speaker or microphone to collect sound at the rear side; and a locking mechanism for maintaining the arm holders clamped to the user's arm, the locking mechanism comprising a protrusion formed in one of the main body and an arm holder and a corresponding depression formed in the other one of the main body and an arm holder for receiving the protrusion and maintaining the arm holders in a given position with respect to the main body.

3. A wrist mobile information device comprising: a main body; a mobile communication circuit disposed in the main body and having at least one of a speaker and a microphone exposed at an external surface of the main body; a pair of arm holders each mounted to the main body proximate one of the speaker and the microphone for attaching the main body to a user's arm, the arm holders each comprising a rigid member curved to conform to the contour of the user's arm and being different in length from each other, the arm holders being configured so that when the arm holders are in a closed state and the wrist mobile information device is worn on a user's wrist with a rear side of the device confronting the user's wrist, a space is formed on a front side of the device opposite the rear side between the arm holders and the speaker or microphone to collect sound at the front side, and when the wrist mobile information device is not worn on the user's wrist and the arm holders are in an open state, a space is formed on the rear side of the device between the arm holders and the speaker or microphone to collect sound at the rear side; and a locking mechanism for maintaining the arm holders clamped to the user's arm, the locking mechanism comprising a ratchet mechanism having a first pawl provided in at least one of the arm holders and a second pawl provided in the main body to engage the pawl in the arm holder.

4. A wrist mobile information device according to claim 3; wherein the pawls have saw tooth members oriented to allow rotation of the arm holders in only one direction when the pawls of the arm holder and main body engage each other.

5. A wrist mobile information device according to claim 4; wherein the direction of rotation of the arm holders is a closing direction of the arm holders so that the ratchet mechanism holds the arm holders in a clamped position on the user's wrist.

6. A wrist mobile information device comprising: a main body; a mobile communication circuit disposed in the main body and having at least one of a speaker and a microphone exposed at an external surface of the main body; a pair of arm holders each mounted to the main body proximate one of the speaker and the microphone for attaching the main body to a user's arm, the arm holders each comprising a rigid member curved to conform to the contour of the user's arm and being different in length from each other, the arm holders being configured so that when the arm holders are in a closed state and the wrist mobile information device is worn on a user's wrist with a rear side of the device confronting the user's wrist, a space is formed on a front side of the device opposite the rear side between the arm holders and the speaker or microphone to collect sound at the front side, and when the wrist mobile information device is not worn on the user's wrist and the arm holders are in an open state, a space is formed on the rear side of the device between the arm holders and the speaker or microphone to collect sound at the rear side; and a locking mechanism for maintaining the arm holders clamped to the user's arm; wherein the arm holders each have a rotary shaft and are pivotably mounted about the rotary shafts to opposite ends of the main body; and the locking mechanism comprises a ratchet mechanism having first pawls disposed in the rotary shafts of the arm holders and second pawls opposing the first pawls provided in the main body for engaging the first pawls.

7. A wrist mobile information device according to claim 6; wherein the pawls have saw tooth members oriented so that when opposing pawls are engaged, the arm holders can undergo pivotal movement with respect to the main body in only one direction.

8. A wrist mobile information device according to claim 7; wherein the one direction is a closing direction of the arm holders, such that the ratchet mechanism holds the arm holders in a closed position on the user's wrist.

9. A wrist mobile information device according to claim 6; wherein the ratchet mechanism further comprises a spring member disposed in each rotary shaft for urging the first pawls into engagement with the second pawls; and further comprising a ratchet release button provided on the main body for disengaging the first and second pawls against the biasing force of the spring member.

10. A wrist mobile information device according to claim 9; further comprising a spring member for biasing the arm members in an open position so that activation of the ratchet release button causes the arm holders to spring open so that the device may be quickly removed from the user's arm.

11. A wrist mobile information device comprising: a main body; a mobile communication circuit disposed in the main body and having at least one of a speaker and a microphone exposed at an external surface of the main body; a pair of arm holders each mounted to the main body proximate one of the speaker and the microphone for attaching the main body to a user's arm, the arm holders each comprising a rigid member curved to conform to the contour of the user's arm and being different in length from each other, the arm holders being configured so that when the arm holders are in a closed state and the wrist mobile information device is worn on a user's wrist with a rear side of the device confronting the user's wrist, a space is formed on a front side of the device opposite the rear side between the arm holders and the speaker or microphone to collect sound at the front side, and when the wrist mobile information device is not worn on the user's wrist and the arm holders are in an open state, a space is formed on the rear side of the device between the arm holders and the speaker or microphone to collect sound at the rear side; wherein the mobile communication circuit is a mobile telephone circuit; and wherein a microphone and a speaker of the mobile telephone circuit are mounted at opposing ends of the main body proximate a point of attachment of the arm holders to the main body.

12. A wrist mobile information device comprising: a main body; a mobile communication circuit disposed in the main body; a pair of arm holders each mounted through a rotary shaft thereof to an opposite end of the main body and being axially pivotable about the rotary shaft with respect to the main body and having a ratchet mechanism disposed in the rotary shaft for maintaining the arm holder in a closed position on a user's arm, the arm holders comprising rigid members each mounted to an opposite end of the main body, the rigid members being curved to conform to the user's wrist; and a release button exposed at an external surface of the main body for releasing a locking force of the ratchet mechanism.

13. A wrist mobile information device comprising: a main body; a mobile communication circuit disposed in the main body; a pair of arm holders each mounted through a rotary shaft thereof to an opposite end of the main body and being axially pivotable about the rotary shaft with respect to the main body and having a ratchet mechanism disposed in the rotary shaft for maintaining the arm holder in a closed position on a user's arm, the ratchet mechanism comprising a first pawl provided in the rotary shaft and a second pawl provided in the main body to engage the first pawl; and a release button exposed at an external surface of the main body for releasing a locking force of the ratchet mechanism.

14. A wrist mobile information device according to claim 13; wherein the pawls have saw tooth members oriented to allow rotation of the arm holders in only one direction when engaged.

15. A wrist mobile information device according to claim 14; wherein the direction of rotation of the arm holders is a closing direction so that the ratchet mechanism holds the arm holders in a clamped position on the user's wrist.

16. A wrist mobile information device according to claim 14; wherein the ratchet mechanism further comprises a spring member disposed in each rotary shaft for urging the first pawl into engagement with the second pawl; and further comprising a ratchet release button provided on the main body for disengaging the first and second pawls against the biasing force of the spring member.

17. A wrist mobile information device comprising: a main body; a mobile communication circuit disposed in the main body; a pair of arm holders each mounted through a rotary shaft thereof to an opposite end of the main body and being axially pivotable about the rotary shaft with respect to the main body and having a ratchet mechanism disposed in the rotary shaft for maintaining the arm holder in a closed position on a user's arm; and a release button exposed at an external surface of the main body for releasing a locking force of the ratchet mechanism; wherein the mobile communication circuit is a mobile telephone circuit; and wherein a microphone and a speaker of the mobile telephone circuit are mounted at opposing ends of the main body proximate points of attachment of the arm holders to the main body.

18. A wrist mobile information device comprising: a main body; a mobile communication device disposed in the main body; and a pair of arm holders attached to the main body for mounting the main body to a user's arm, the arm holders being configured so that when the arm holders are in a closed state and the wrist mobile information device is worn on a user's wrist with a rear side of the device confronting the user's wrist, a space is formed on a front side of the device opposite the rear side between the arm holders and a speaker or microphone of the mobile communication device to collect sound at the front side, and when the wrist mobile information device is not worn on the user's wrist and the arm holders are in an open state, a space is formed on the rear side of the device between the arm holders and the speaker or microphone to collect sound at the rear side; wherein the arm holders comprise rigid members each mounted to an opposite end of the main body, the rigid members being curved to conform to the user's wrist.

19. A wrist mobile information device comprising: a main body; a mobile communication device disposed in the main body; and a pair of arm holders attached to the main body for mounting the main body to a user's arm, the arm holders being configured so that when the arm holders are in a closed state and the wrist mobile information device is worn on a user's wrist with a rear side of the device confronting the user's wrist, a space is formed on a front side of the device opposite the rear side between the arm holders and a speaker or microphone of the mobile communication device to collect sound at the front side, and when the wrist mobile information device is not worn on the user's wrist and the arm holders are in an open state, a space is formed on the rear side of the device between the arm holders and the speaker or microphone to collect sound at the rear side; wherein the arm holders are mounted through a rotary shaft to the main body, and a ratchet mechanism is disposed in the rotary shafts, the ratchet mechanism having a first pawl provided in the rotary shaft and a second pawl provided in the main body to engage the first pawl.

20. A wrist mobile information device according to claim 19; wherein the pawls have saw tooth members oriented to allow rotation of the arm holders in only one direction when engaged.

21. A wrist mobile information device according to claim 20; wherein the direction of rotation of the arm holders is a closing direction so that the ratchet mechanism holds the arm holders in a clamped position on the user's wrist.

22. A wrist mobile information device according to claim 20; wherein the ratchet mechanism further comprises a spring member disposed in each rotary shaft for urging the first pawl into engagement with the second pawl; and further comprising a ratchet release button provided on the main body for disengaging the first and second pawls against the biasing force of the spring member.

23. A wrist mobile information device comprising: a main body; a mobile communication device disposed in the main body; and a pair of arm holders attached to the main body for mounting the main body to a user's arm, the arm holders being configured so that when the arm holders are in a closed state and the wrist mobile information device is worn on a user's wrist with a rear side of the device confronting the user's wrist, a space is formed on a front side of the device opposite the rear side between the arm holders and a speaker or microphone of the mobile communication device to collect sound at the front side, and when the wrist mobile information device is not worn on the user's wrist and the arm holders are in an open state, a space is formed on the rear side of the device between the arm holders and the speaker or microphone to collect sound at the rear side; wherein the mobile communication device is a mobile telephone circuit; and wherein a microphone and a speaker of the mobile telephone circuit are mounted at opposing ends of the main body proximate points of attachment of the arm holders to the main body.

24. A wrist-wearable mobile information device comprising: a main body; a mobile communication circuit disposed in the main body; arm holders each mounted through a rotary shaft to an opposite end of the main body and being axially pivotable about the rotary shaft with respect to the main body; a lock mechanism mounted on the rotary shaft to restrain rotation of at least one of the arm holders about the main body; and a push button disposed on the main body to release a restraining force of the lock mechanism; wherein the rotary shafts each have a main body side and an arm member side, the lock mechanism comprises a first engaging member disposed at the main body side of at least one of the rotary shafts and a second engaging member disposed at the arm holder side of the at least one rotary shaft for restraining rotation of the arm holder about the main body when first and second meshing members of the first and second engaging members are engaged, and engagement of the first and the second engaging members is released by pushing the push button.

25. A wrist-wearable mobile information device according to claim 24; wherein the first and second engaging members each have saw tooth members; and further comprising a ratchet mechanism that allows the at least one arm holder to undergo pivotal movement with respect to the main body in only one direction, the ratchet mechanism being formed by engagement of the respective saw tooth members of the first and second engaging members.

26. A wrist-wearable mobile information device according to claim 25; wherein the allowed direction of pivotal movement is a closing direction of the at least one arm holder, so that the lock mechanism holds the arm holder in a clamped position on a user's wrist.

27. A wrist-wearable mobile information device comprising: a main body; a mobile communication circuit disposed in the main body; arm holders each mounted through a rotary shaft to an opposite end of the main body and being axially pivotable about the rotary shaft with respect to the main body; a lock mechanism mounted on the rotary shaft to restrain rotation of at least one of the arm holders about the main body; a push button disposed on the main body to release a restraining force of the lock mechanism; and a spring mounted to the rotary shaft for applying a biasing force in an opening direction of the arm holders so that the arm holders automatically release from a user's wrist when the lock mechanism is released.

28. A wrist-wearable mobile information device comprising: a main body; a mobile communication circuit disposed in the main body; arm holders each mounted through a rotary shaft to an opposite end of the main body and being axially pivotable about the rotary shaft with respect to the main body; a lock mechanism mounted on the rotary shaft to restrain rotation of at least one of the arm holders about the main body; and a push button disposed on the main body to release a restraining force of the lock mechanism; wherein the mobile communication circuit is a mobile telephone circuit; and wherein a microphone and a speaker of the mobile telephone circuit are mounted at opposed ends of the main body proximate a point of attachment of the arm holders to the main body.

29. A wrist-wearable mobile information device according to claim 28; wherein the arm holders are configured so that when the arm holders are in a closed state and the wrist mobile information device is worn on a user's wrist with a rear side of the device confronting the user's wrist, a space is formed on a front side of the device opposite the rear side between the arm holders and the speaker and microphone to collect sound at the front side, and when the wrist mobile information device is not worn on the user's wrist and the arm holders are in an open state, a space is formed on the rear side of the device between the arm holders and the speaker and microphone to collect sound at the rear side.

30. A wrist-wearable mobile information device comprising: a main body; a mobile communication circuit disposed in the main body; arm holders each mounted through a rotary shaft to an opposite end of the main body and being axially pivotable about the rotary shaft with respect to the main body; and a ratchet mechanism that permits the arm holders to undergo pivotal movement with respect to the main body in only one direction, the ratchet mechanism comprising an elongate hole formed in the rotary shaft, a spring slidably engaged in the elongate hole, a ratchet block having a saw tooth portion at one end inserted between the spring and an open side of the elongate hole, a pawl crown having a saw tooth portion confronting the saw tooth portion of the ratchet block, and a ratchet shaft having one end extending through the pawl crown and having a push button on an opposite end exposed to an outer side of the main body to urge the ratchet block into contact with the spring; wherein the ratchet mechanism restrains rotation of the arm holders about the main body by engaging the sat tooth portions of the ratchet block and the pawl crown by a bias force applied by the spring, and engagement of the saw tooth portions of the ratchet block and the pawl crown is released by pushing the push button.

31. A wrist-wearable mobile information device according to claim 30; further comprising a spring member mounted to the rotary shaft for applying a biasing force in an opening direction of the arm holders so that the arm holders automatically release from a user's wrist when the push button is pushed.

32. A wrist-wearable mobile information device according to claim 30; wherein the one direction of rotation of the arm holders is a closing direction of the arm holders, so that the ratchet mechanism holds the arm holders in a clamped position on a user's wrist.

33. A wrist-wearable mobile information device according to claim 30; wherein the arm holders comprise rigid members curved to conform to the counter of a user's wrist.

34. A wrist-wearable mobile information device according to claim 30; wherein the arm holders are formed of metal.

35. A wrist-wearable mobile information device according to claim 30; wherein the arm holders are formed of plastic.

36. A wrist-wearable mobile information device according to claim 30; wherein the circuit is a mobile telephone circuit; and further comprising a microphone or a speaker of the mobile telephone circuit mounted at opposed ends of the main body proximate a point of attachment of the arm holders to the main body.

37. A wrist-wearable mobile information device according to claim 36; wherein the arm holders are configured so that when the arm holders are in a closed state and the wrist mobile information device is worn on a user's wrist with a rear side of the device confronting the user's wrist, a space is formed on a front side of the device opposite the rear side between the arm holders and the speaker or microphone to collect sound at the front side, and when the wrist mobile information device is not worn on the user's wrist and the arm holders are in an open state, a space is formed on the rear side of the device between the arm holders and the speaker or microphone to collect sound at the rear side.

38. A wrist-wearable mobile information device according to claim 30; wherein the push button is disposed on the rotary shaft.

* * * * *